United States Patent
Li et al.

(10) Patent No.: US 10,868,388 B2
(45) Date of Patent: Dec. 15, 2020

(54) MULTIFUNCTIONAL HIGH-VOLTAGE CONNECTOR

(71) Applicant: CONTEMPORARY AMPEREX TECHNOLOGY CO., LIMITED, Ningde (CN)

(72) Inventors: Jianwei Li, Ningde (CN); Libing Chan, Ningde (CN); Linggang Zhou, Ningde (CN); Zhiqin Weng, Ningde (CN); Shengshen Ruan, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 16/669,028

(22) Filed: Oct. 30, 2019

(65) Prior Publication Data

US 2020/0153158 A1 May 14, 2020

(30) Foreign Application Priority Data

Nov. 8, 2018 (CN) ..................... 2018 2 1835165 U

(51) Int. Cl.
*H01R 13/53* (2006.01)
*H01M 2/20* (2006.01)
(Continued)

(52) U.S. Cl.
CPC .............. *H01R 13/53* (2013.01); *H01M 2/20* (2013.01); *H01R 13/502* (2013.01);
(Continued)

(58) Field of Classification Search
CPC ...... H01R 13/502; H01R 13/24; H01R 13/42; H01R 13/53; H01R 13/5812;
(Continued)

(56) References Cited

U.S. PATENT DOCUMENTS

2009/0047814 A1* 2/2009 Daamen ................. H01R 13/18
439/251
2009/0309689 A1* 12/2009 Pavlovic .............. H01H 85/153
337/187
(Continued)

FOREIGN PATENT DOCUMENTS

CN 202004021 U 10/2011
CN 206864727 U * 1/2018
(Continued)

OTHER PUBLICATIONS

Contemporary Amperex Technology Co., Limited, International Search Report, PCT/CN2019/114410, dated Jan. 31, 2020, 9 pgs. -No Translation Available-.

*Primary Examiner* — Abdullah A Riyami
*Assistant Examiner* — Nader J Alhawamdeh
(74) *Attorney, Agent, or Firm* — Morgan, Lewis & Bockius LLP

(57) ABSTRACT

The present disclosure provides a multifunctional high-voltage connector and a battery product. The multifunctional high-voltage connector comprises a pedestal and an upper cover detachably assembled with the pedestal. The upper cover comprises: an outer shell having a first oblique-port portion; and an inner shell fixed at an inner side of the outer shell and provided with a first guide portion; the pedestal comprising: an outer base having a second oblique-port portion; and an inner base fixed at an inner side of the outer base and provided with a second guide portion. The first oblique-port portion of the outer shell cooperates with the second oblique-port portion of the outer base, and the first guide portion of the inner shell cooperates with the second guide portion of the inner base. The battery product comprises the multifunctional high-voltage connector.

20 Claims, 4 Drawing Sheets

(51) Int. Cl.
  *H01R 13/502*  (2006.01)
  *H01R 13/621*  (2006.01)
  *H01R 13/631*  (2006.01)
  *H01R 13/66*  (2006.01)
  *H01R 13/52*  (2006.01)

(52) U.S. Cl.
  CPC ....... *H01R 13/6215* (2013.01); *H01R 13/631* (2013.01); *H01R 13/6675* (2013.01); *H01R 13/5219* (2013.01)

(58) Field of Classification Search
  CPC ............. H01R 13/6582; H01R 13/696; H01M 2/1077; H01M 2/202
  See application file for complete search history.

(56) References Cited

U.S. PATENT DOCUMENTS

| | | | |
|---|---|---|---|
| 2015/0024629 A1* | 1/2015 | Snader | H01R 13/6585 439/607.01 |
| 2015/0072188 A1* | 3/2015 | Dulle | H05K 3/32 429/61 |
| 2020/0059019 A1* | 2/2020 | Li | H01R 11/287 |
| 2020/0059027 A1* | 2/2020 | Li | H01R 13/688 |
| 2020/0059031 A1* | 2/2020 | Li | H01M 2/1077 |

FOREIGN PATENT DOCUMENTS

| | | |
|---|---|---|
| CN | 207116791 U | 3/2018 |
| CN | 207819094 U | 9/2018 |
| CN | 207967540 U | 10/2018 |
| CN | 208955294 U | 6/2019 |

\* cited by examiner

MULTIFUNCTIONAL HIGH-VOLTAGE CONNECTOR

CROSS-REFERENCE TO RELATED APPLICATIONS

The present application claims priority to Chinese patent application No. CN201821835165.0, filed on Nov. 8, 2018, which is incorporated herein by reference in its entirety.

FIELD OF THE PRESENT DISCLOSURE

The present disclosure relates to the field of connector technology, and particularly relates to a multifunctional high-voltage connector and a battery product.

BACKGROUND OF THE PRESENT DISCLOSURE

In a battery product (such as a battery pack or a high-voltage cartridge), the common connectors comprise a high-voltage connector, a Manual Service Disconnect (MSD) and a fuse. The high-voltage connector is used for realizing the electrical connection between the battery product and an external device (such as another battery pack or another high voltage cartridge), the MSD is used for controlling the high voltage circuit in the battery product to be turned on or turned off, the fuse is used for overload protecting the high voltage circuit in the battery product.

When the energy density of the battery product is increased, it is necessary to integrate the connectors with multiple functions into an integrated multifunctional high-voltage connector, Since the multiple functions are integrated, it does not facilitate the mounting and detachment between the upper cover and the pedestal of the new multifunctional high-voltage connector, thereby resulting in low assembling efficiency and low assembling accuracy.

SUMMARY OF THE PRESENT DISCLOSURE

In view of the problem existing in the background, an object of the present disclosure is to provide a multifunctional high-voltage connector and a battery product, the multifunctional high-voltage connector facilitates assembling, improves the assembling efficiency and assembling accuracy.

In order to achieve the above object, the present disclosure provides a multifunctional high-voltage connector, which comprises a pedestal and an upper cover detachably assembled with the pedestal. The upper cover comprises: an outer shell having a first oblique-port portion; and an inner shell fixed at an inner side of the outer shell and provided with a first guide portion;

the pedestal comprising: an outer base having a second oblique-port portion; and an inner base fixed at an inner side of the outer base and provided with a second guide portion. The first oblique-port portion of the outer shell cooperates with the second oblique-port portion of the outer base, and the first guide portion of the inner shell cooperates with the second guide portion of the inner base.

An angle between a lower surface of the first oblique-port portion and a longitudinal direction and an angle between an upper surface of the second oblique-port portion and the longitudinal direction are both $\theta$, and $5 \leq \theta \leq 8$.

The first guide portion is a recessed groove, and the second guide portion is a protrusion. Or, the first guide portion is a protrusion, and the second guide portion is a recessed groove.

The inner shell further comprises: a body portion accommodated in the outer shell; and an extending portion protruding from the body portion in a vertical direction and extending out of the outer shell. The first guide portion is provided on the extending portion and extends in the vertical direction, and the extending portion is inserted into the inner base to make the first guide portion cooperate with the second guide portion.

The first guide portions are provided on both sides of the extending portion in a longitudinal direction. Or/and, the first guide portions are provided on both sides of the extending portion in a transversal direction.

The outer shell further comprises: a first connecting portion formed at an outer side of the first oblique-port portion around a circumference of the first oblique-port portion and extending in a vertical direction. The outer base further comprises: a second connecting portion formed at an outer side of the second oblique-port portion around a circumference of the second oblique-port portion and connecting the first connecting portion. A lower surface of the first connecting portion and an upper surface of the second connecting portion are parallel to a longitudinal direction.

The outer shell further comprises: a guiding portion formed at an outside of the first oblique-port portion and extending in a direction paralleled to a lower surface of the first oblique-port portion.

The multifunctional high-voltage connector further comprises a conductive connection structure and two mating terminals. The conductive connection structure comprises: a main body portion accommodated in the inner shell of the upper cover; and two conductive connection portions formed at both ends of the main body portion in a longitudinal direction and extending out of the outer shell. the two mating terminals are spaced apart in the longitudinal direction, and each of the mating terminals is fixedly mounted to the inner base of the pedestal and mates with a corresponding conductive connection portions.

The inner base further comprises: a bottom plate portion; and two protruding portions spaced apart in the longitudinal direction, and each of the protruding portions protrudes from the bottom plate portion in a vertical direction and mounts the corresponding mating terminal. The second guide portion is provided on each of the protruding portions. Moreover, the multifunctional high-voltage connector further comprises: a harness assembly connected to one of the two mating terminals. The outer base further comprises: a mounting portion formed at an outer side of the second oblique-port portion and extending in the longitudinal direction, and the mounting portion mounts the harness assembly. The highest point of an upper surface of the second oblique-port portion is higher than a top surface of the mounting portion. In addition, the outer shell and the outer base is made of a metal material, and the inner shell and the inner base is made of an insulating material.

The present disclosure further provides a battery product, which comprises the multifunctional high-voltage connector described above.

The present disclosure has the following beneficial effects: since the first oblique-port portion of the outer shell is an oblique-port structure, which reduces the weight of the upper cover and facilitates the mounting and detachment between the upper cover and the pedestal; and at the same time, the cooperation between the first guide portion of the inner shell and the second guide portion of the inner base can provide a guide for the mounting between the upper cover and the pedestal, and the cooperation between the first guide portion and the second guide portion can be reliably operated by the visual positioning, therefore it is not necessary to assemble many times and can ensure the accurate mounting between the upper cover and the pedestal, and thus the multifunctional high-voltage connector according to the present disclosure greatly improves the assembling efficiency and assembling accuracy of the multifunctional high-voltage connector. In addition, since the second oblique-port portion of the pedestal may also be an oblique-port structure, the cooperation between the second oblique-port portion and the first oblique-port portion of the upper cover reduces the internal space of the multifunctional high-voltage connector and improves the space utilization of the multifunctional high-voltage connector.

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second" and the like are only used for illustrative purposes and are not to be construed as expressing or implying a relative importance. The term "plurality" is two or more. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

In the description of the present disclosure, it should be understood that spatially relative terms, such as "above", "below" "inside", "outside" and the like, are described based on orientations illustrated in the figures, but are not intended to limit the embodiments of the present disclosure.

Figure 1:
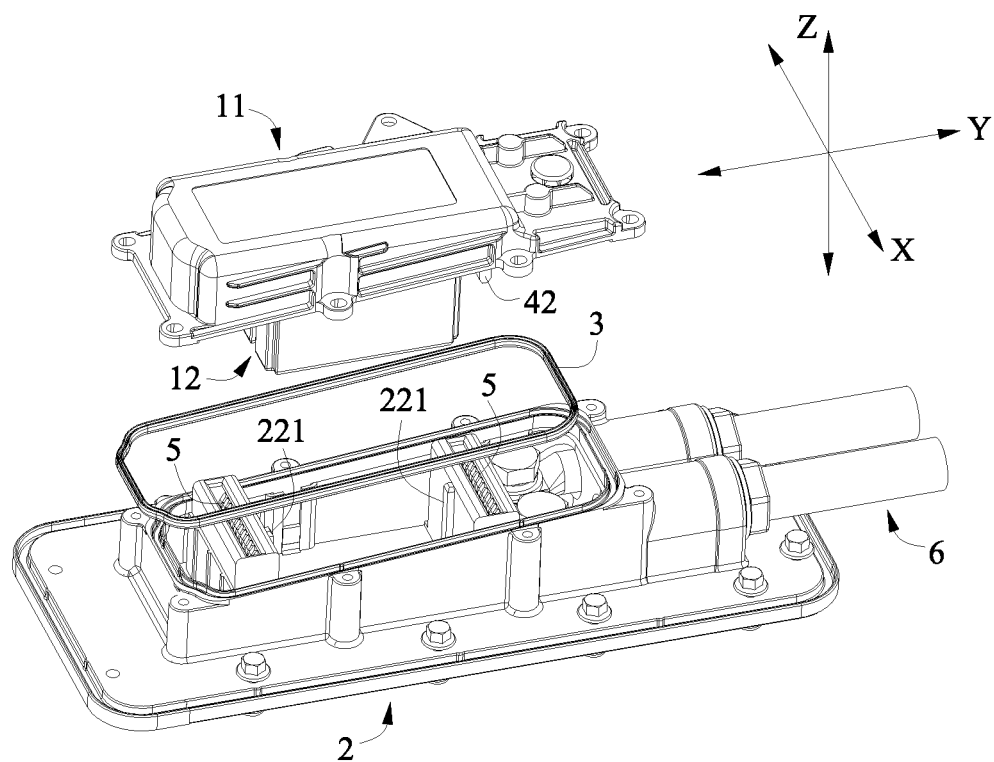
FIG. 1 is an exploded view of a multifunctional high-voltage connector according to the present disclosure.
Figure 2:
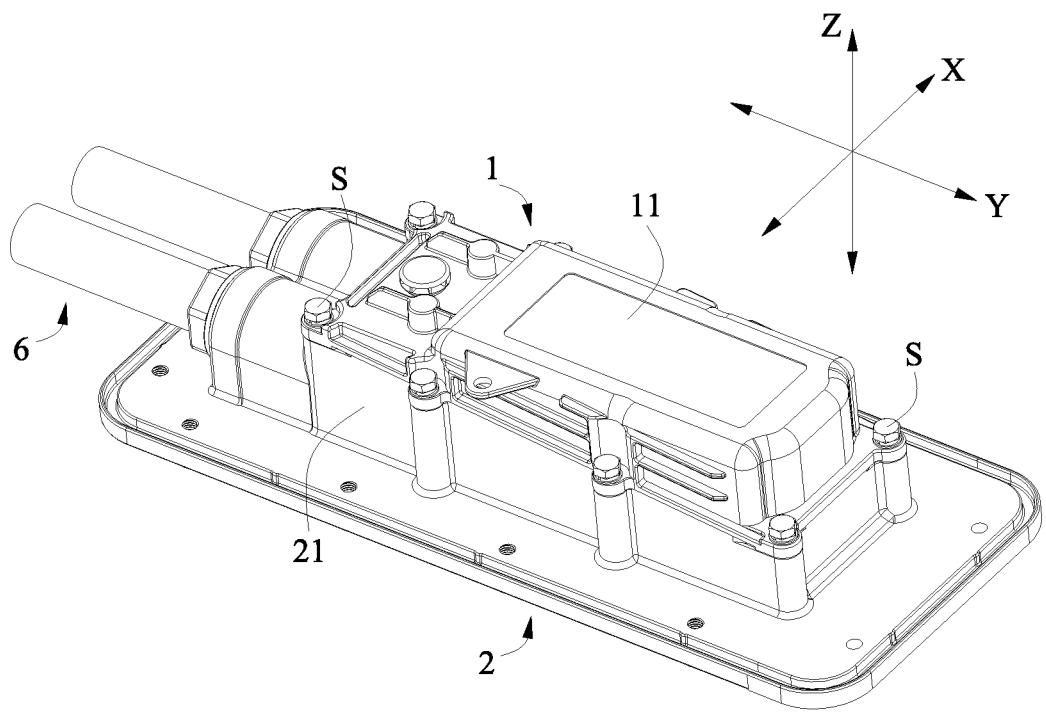
FIG. 2 is an assembled view of FIG. 1.

Referring to FIG. 1 and FIG. 2, a multifunctional high-voltage connector according to the present disclosure comprises an upper cover 1, a pedestal 2, a sealing ring 3, a conductive connection structure 4, two mating terminals 5 and a harness assembly 6.

Figure 3:
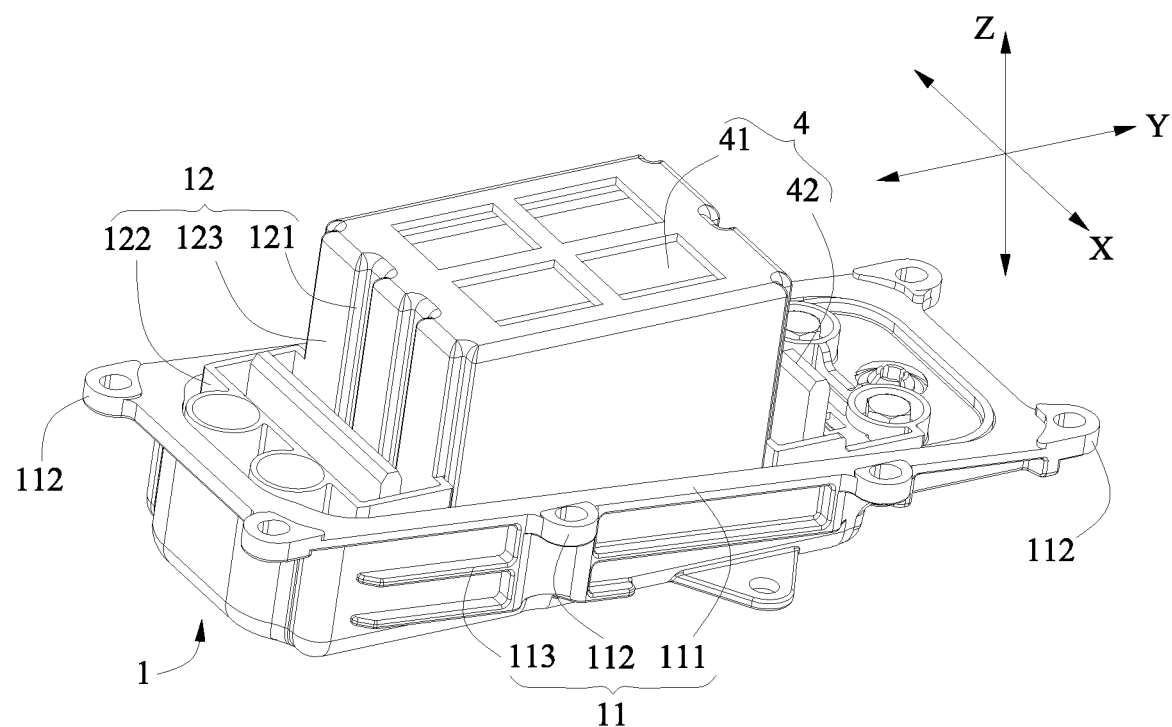
FIG. 3 is a schematic view showing the mounting of a conductive connection structure and an upper cover of the multifunctional high-voltage connector.
Figure 4:
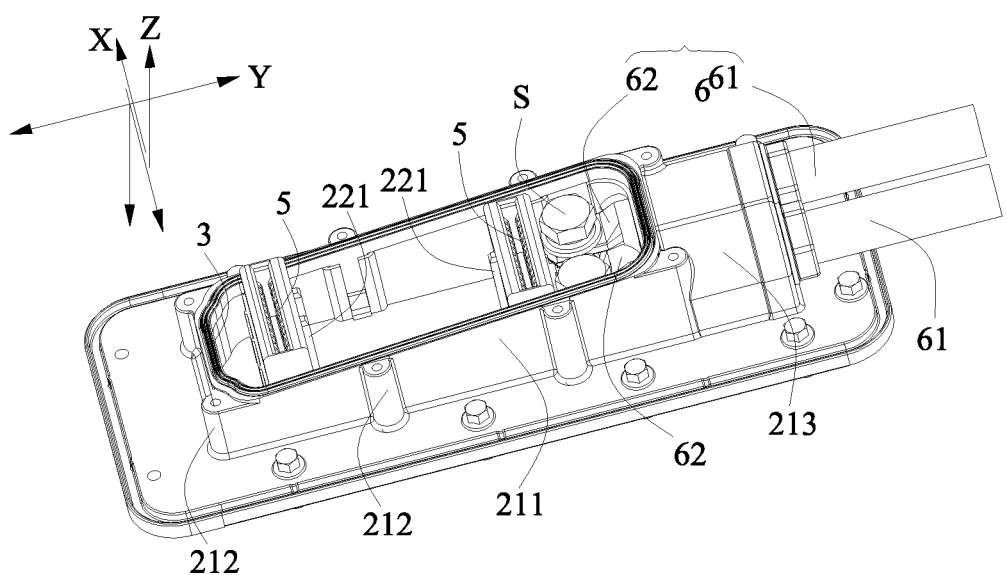
FIG. 4 is a schematic view showing the mounting of a mating terminal, a harness assembly and a pedestal of the multifunctional high-voltage connector.
Figure 5:
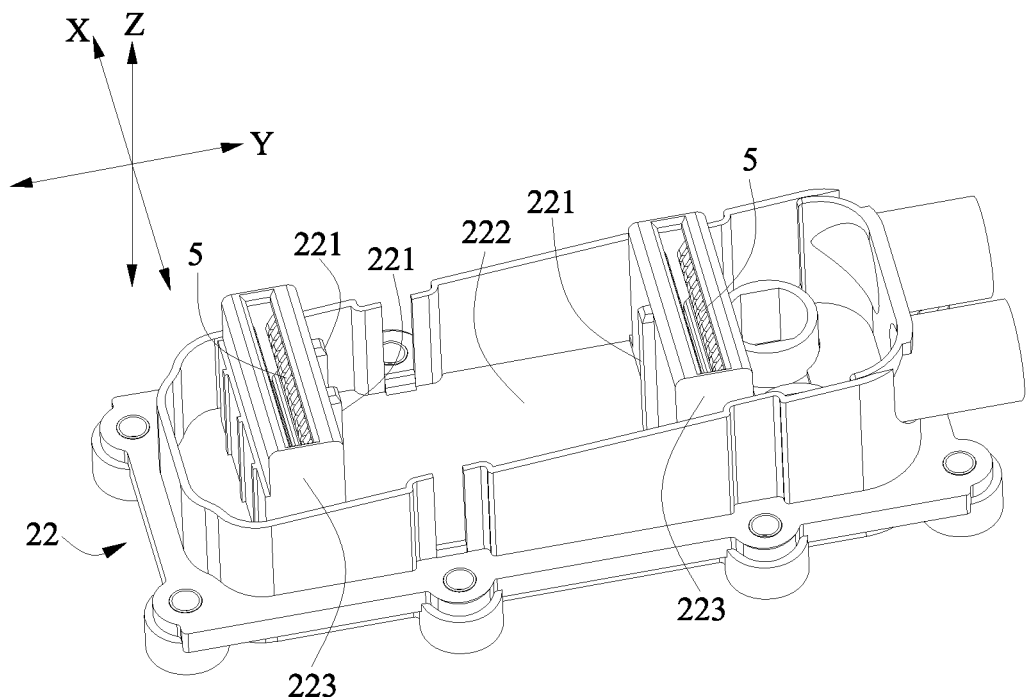
FIG. 5 is a schematic view showing the mounting of an inner base of the pedestal and the mating terminal of FIG. 4.
Figure 6:
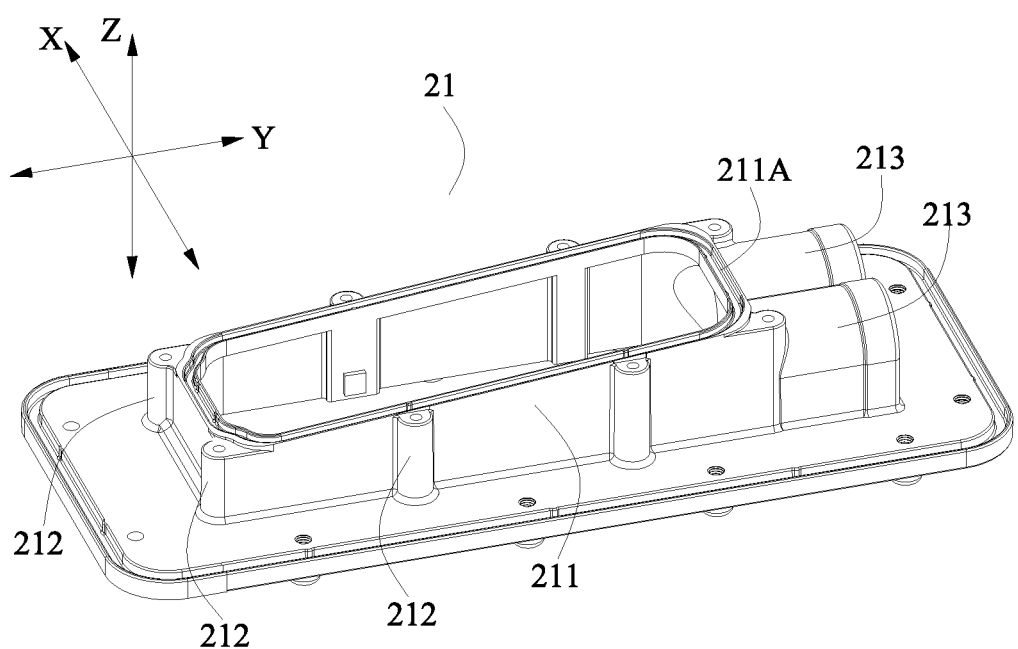
FIG. 6 is a perspective view of an outer base of the pedestal.

The upper cover 1 is detachably assembled with the pedestal 2. Referring to FIG. 3, the upper cover 1 may comprise: an outer shell 11 having a first oblique-port portion 111; and an inner shell 12 fixed at an inner side of the outer shell 11 and provided with a first guide portion 121. Referring to FIG. 4 to FIG. 6, the pedestal 2 may comprise: an outer base 21 having a second oblique-port portion 211; and an inner base 22 fixed at an inner side of the outer base 21 and provided with a second guide portion 221. The outer shell 11 and the outer base 21 may be made of a metal material, and the inner shell 12 and the inner base 22 may be made of an insulating material.

When the upper cover 1 is assembled with the pedestal 2, firstly the first guide portion 121 of the inner shell 12 and the second guide portion 221 of the inner base 22 cooperate (such as a concave-convex fit as described below) by a visual positioning, then the upper cover 1 can gradually approach the pedestal 2 along the cooperation direction of the first guide portion 121 and the second guide portion 221 until the first oblique-port portion 111 of the outer shell 11 cooperates (i.e., the first oblique-port portion 111 and the second oblique-port portion 211 abut against each other face to face) with the second oblique-port portion 211 of the outer base 21, and it means that the upper cover 1 is mounted in place.

Since the first oblique-port portion 111 of the outer shell 11 is an oblique-port structure, which reduces the weight of the upper cover 1 and facilitates the mounting and detachment between the upper cover 1 and the pedestal 2; and at the same time, the cooperation between the first guide portion 121 of the inner shell 12 and the second guide portion 221 of the inner base 22 can provide a guide for the mounting between the upper cover 1 and the pedestal 2, and the cooperation between the first guide portion 121 and the second guide portion 221 can be reliably operated by the visual positioning, therefore it is not necessary to assemble many times and can ensure the accurate mounting between the upper cover 1 and the pedestal 2, and thus the multifunctional high-voltage connector according to the present disclosure greatly improves the assembling efficiency and assembling accuracy of the multifunctional high-voltage connector. In addition, since the second oblique-port portion 211 of the pedestal 2 may also be an oblique-port structure, the cooperation between the second oblique-port portion 211 and the first oblique-port portion 111 of the upper cover 1 reduces the internal space of the multifunctional high-voltage connector and improves the space utilization of the multifunctional high-voltage connector.

Referring to FIG. 1, FIG. 4 and FIG. 6, the second oblique-port portion 211 of the outer base 21 is provided with a receiving groove 211A, and the receiving groove 211A is used for receiving the sealing ring 3. When the upper cover 1 and the pedestal 2 are assembled, the sealing ring 3 is pressed in the receiving groove 211A to seal the outer base 21 of the pedestal 2 and the outer shell 11 of the upper cover 1.

Figure 7:
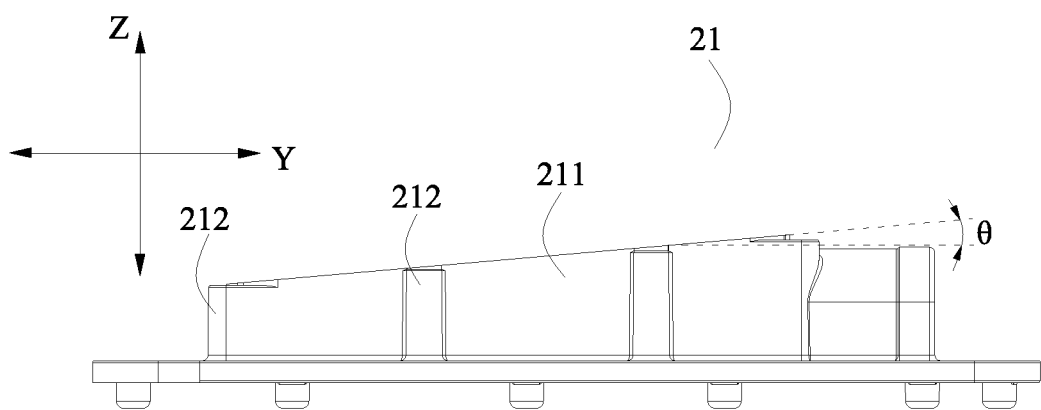
FIG. 7 is a front view of FIG. 6.
Reference numerals are represented as follows:
1 upper cover
  11 outer shell
    111 first oblique-port portion
    112 first connecting portion
    113 guiding portion
  12 inner shell
    121 first guide portion
    122 body portion
    123 extending portion
2 pedestal
  21 outer base
    211 second oblique-port portion
      211A receiving groove
    212 second connecting portion
    213 mounting portion
  22 inner base
    221 second guide portion
    222 bottom plate portion
    223 protruding portion
3 sealing ring
4 conductive connection structure
  41 main body portion
  42 conductive connection portion
5 mating terminal
6 harness assembly
  61 wire harness body
  62 connection terminal
S fastener
X transversal direction
Y longitudinal direction
Z vertical direction

Referring to FIG. 7, an angle between the lower surface (i.e., the mounting surface) of the first oblique-port portion 111 and a longitudinal direction Y and an angle between the upper surface (i.e., the mounting surface) of the second oblique-port portion 211 and the longitudinal direction Y are both θ. Since the lighter the quality of the upper cover 1 is, the more it is helpful to improve the assembling efficiency and assembling accuracy of the multifunctional high-voltage connector, therefore in order to minimize the weight of the upper cover 1, the size of θ needs to be designed in a reasonable extent. After many designs and operations of mounting, the inventors found that when 5≤θ≤8, it is most beneficial to the mounting and detachment between the upper cover 1 and the pedestal 2.

The manner of cooperation between the first guide portion 121 of the inner shell 12 and the second guide portion 221 of the inner base 22 may be a concave-convex fit. Specifically, the first guide portion 121 is a recessed groove (as shown in FIG. 3); correspondingly, the second guide portion 221 is a protrusion (as shown in FIG. 4 and FIG. 5). Alternatively, the first guide portion 121 is a protrusion; correspondingly, the second guide portion 221 is a recessed groove.

Referring to FIG. 3, the outer shell 11 may further comprise a first connecting portion 112 formed at an outer side of the first oblique-port portion 111 around a circumference of the first oblique-port portion 111 and extending in a vertical direction Z. Referring to FIG. 4 and FIG. 6, the outer base 21 may further comprise a second connecting portion 212 formed at an outer side of the second oblique-port portion 211 around a circumference of the second oblique-port portion 211.

Both the first connecting portion 112 and the second connecting portion 212 may be provided as multiple in number. The multiple first connecting portions 112 are spaced apart at the outer side of the first oblique-port portion 111 around the circumference of the first oblique-port portion 111, the multiple second connecting portion 212 are spaced apart at the outer side of the second oblique-port portion 211 around the circumference of the second oblique-port portion 211.

Referring to FIG. 2, each first connecting portion 112 may be connected to the corresponding second connecting portion 212 by a fastener S (such as a connecting bolt). In order to ensure that the locking force of the fastener S is not decomposed during the process of connecting, both a lower surface of the first connecting portion 112 and an upper surface of the second connecting portion 212 are parallel to the longitudinal direction Y. In other words, the lower surface of the first connecting portion 112 and the upper surface of the second connecting portion 212 are both planar. In order to increase the strength of the upper cover 1, referring to FIG. 1 to FIG. 3, the outer shell 11 may comprise a guiding portion 113 formed at the outside of the first oblique-port portion 111 and protruding from the first oblique-port portion 111. It should be noted that, since the first oblique-port portion 111 is the oblique-port structure, if the guiding portion 113 extends in the vertical direction Z, it is easy to enlarge the mass difference between the two ends of the upper cover 1 in the longitudinal direction Y, which makes the center of gravity shifted and is not beneficial to the mounting and detachment between the upper cover 1 and the pedestal 2. Therefore, in order to facilitate the mounting and operation, the guiding portion 113 may be provided at both sides of the outer shell 11 in a transversal direction X and extending in a direction paralleled to the lower surface of the first oblique-port portion 111, that is, the guiding portion 113 extends obliquely relative to the longitudinal direction Y.

Referring to FIG. 6, the outer base 21 may further comprise a mounting portion 213 formed at an outer side of the second oblique-port portion 211 and extending in the longitudinal direction Y, and the mounting portion 213 mounts the harness assembly 6. In the process of assembling, in order not to interfere with the cooperation between the first oblique-port portion 111 and the second oblique-port portion 211, the highest point of the mounting surface of the second oblique-port portion 211 is higher than a top surface of the mounting portion 213.

Referring to FIG. 3, the inner shell 12 may further comprise: a body portion 122 accommodated in the outer shell 11; and an extending portion 123 protruding from the body portion 122 in the vertical direction Z and extending out of the outer shell 11. The first guide portion 121 is provided on the extending portion 123 and extends in the vertical direction Z, when the upper cover 1 is assembled with the pedestal 2, the extending portion 123 of the inner shell 12 is inserted into the inner base 22 of the pedestal 2 to make the first guide portion 121 cooperate with the second guide portion 221.

The first guide portion 121 is provided as multiple in number. In an embodiment, the multiple first guide portions 121 are provided on both sides of the extending portion 123 in the longitudinal direction Y. In another embodiment, the multiple first guide portions 121 may be provided on both sides of the extending portion 123 in the transversal direction X. In still another embodiment, the multiple first guide portions 121 are provided on both sides of the extending portion 123 in the longitudinal direction Y and both sides of the extending portion 123 in the transversal direction X at the same time. That the first guide portion 121 adopts the above arrangement manner makes the opposite sides of the upper cover 1 limited in position during the process of assembling, thereby further ensuring the accurate mounting between the upper cover 1 and the pedestal 2.

The conductive connection structure 4 is fixedly mounted to the upper cover 1. Specifically, referring to FIG. 3, the conductive connection structure 4 may comprise: a main body portion 41 accommodated in the inner shell 12 of the upper cover 1; and two conductive connection portions 42 formed at both ends of the main body portion 41 in the longitudinal direction Y and extending out of the outer shell 11, and each of the conductive connection portions 42 is used for mating connection with one of the mating terminals 5. Here, the conductive connection structure 4 may be a fuse or a one-piece structure (that is a whole piece of connection sheet).

Referring to FIG. 4 and FIG. 5, the two mating terminals 5 are spaced apart in the longitudinal direction Y, and each of the mating terminals 5 is fixedly mounted to the inner base 22 of the pedestal 2. Here, the mating terminal 5 has elasticity. When the mating terminal 5 are mated with the corresponding conductive connection portion 42 of the conductive connection structure 4, the mating terminal 5 can clamp the conductive connection portion 42, thereby ensuring the connection reliability between the conductive connection structure 4 and the mating terminal 5 during the process of use.

Referring to FIG. 5, the inner base 22 may further comprise: a bottom plate portion 222; and two protruding portions 223 spaced apart in the longitudinal direction Y, each of the protruding portions 223 protrudes from the bottom plate portion 222 in the vertical direction Z and mounts the corresponding mating terminal 5. The second guide portion 221 is provided on each of the protruding portions 223.

When the upper cover 1 is assembled with the pedestal 2, based on the cooperation between the first guide portion 121 of the inner shell 12 and the second guide portion 221 of the inner base 22, the conductive connection portion 42 of the conductive connection structure 4 can be accurately inserted into the corresponding protruding portion 223 and mated with the mating terminal 5 in the protruding portion 223, thereby avoiding the ablation problem caused by the abrasion of the mating terminal 5 due to multiple attempts.

Referring to FIG. 4, the harness assembly 6 is mounted to the pedestal 2 and connected to one mating terminal 5 (the other mating terminal 5 is exposed at the bottom of the pedestal 2). Specifically, the harness assembly 6 may comprise: a wire harness body 61, one end of the wire harness body 61 is fixed to the mounting portion 213 of the outer base 21 and the other end of the wire harness body 61 protrudes from the mounting portion 213 in the longitudinal direction Y; and a connection terminal 62 connected to the one end of the wire harness body 61 and the one mating terminal 5.

When the multifunctional high-voltage connector is applied to a battery product (such as a battery pack or a high voltage cartridge), the other mating terminal 5 is connected to the battery inside the battery pack, the harness assembly 6 is connected to other devices (such as another battery pack or another high voltage cartridge) outside the battery pack), thereby achieving an electrical connection between the battery inside the battery product and the other devices.

What is claimed is:

1. A multifunctional high-voltage connector, comprising a pedestal and an upper cover detachably assembled with the pedestal;
    the upper cover comprising: an outer shell having a first oblique-port portion; and an inner shell fixed at an inner side of the outer shell and provided with a first guide portion;
    the pedestal comprising: an outer base having a second oblique-port portion; and an inner base fixed at an inner side of the outer base and provided with a second guide portion;
    the first oblique-port portion of the outer shell cooperating with the second oblique-port portion of the outer base, and the first guide portion of the inner shell cooperating with the second guide portion of the inner base;
    wherein the inner shell further comprises: a body portion accommodated in the outer shell; and an extending portion protruding from the body portion in a vertical direction and extending out of the outer shell; and
    the first guide portion is provided on the extending portion and extends in the vertical direction, and the extending portion is inserted into the inner base to make the first guide portion cooperate with the second guide portion.

2. The multifunctional high-voltage connector according to claim 1, wherein an angle between a lower surface of the first oblique-port portion and a longitudinal direction and an angle between an upper surface of the second oblique-port portion and the longitudinal direction are both θ, and 5≤θ≤8.

3. The multifunctional high-voltage connector according to claim 1, wherein the first guide portion is a recessed groove, and the second guide portion is a protrusion; or the first guide portion is a protrusion, and the second guide portion is a recessed groove.

4. The multifunctional high-voltage connector according to claim 1, wherein
    the first guide portions are provided on both sides of the extending portion in a longitudinal direction; or/and
    the first guide portions are provided on both sides of the extending portion in a transversal direction.

5. The multifunctional high-voltage connector according to claim 1, wherein
    the outer shell further comprises: a first connecting portion formed at an outer side of the first oblique-port portion around a circumference of the first oblique-port portion and extending in a vertical direction;
    the outer base further comprises: a second connecting portion formed at an outer side of the second oblique-port portion around a circumference of the second oblique-port portion and connecting the first connecting portion;
    a lower surface of the first connecting portion and an upper surface of the second connecting portion are parallel to a longitudinal direction.

6. The multifunctional high-voltage connector according to claim 1, wherein the outer shell further comprises: a guiding portion formed at an outside of the first oblique-port portion and extending in a direction paralleled to a lower surface of the first oblique-port portion.

7. The multifunctional high-voltage connector according to claim 1, wherein
    the multifunctional high-voltage connector further comprises a conductive connection structure and two mating terminals;
    the conductive connection structure comprises: a main body portion accommodated in the inner shell of the upper cover; and two conductive connection portions formed at both ends of the main body portion in a longitudinal direction and extending out of the outer shell;
    the two mating terminals are spaced apart in the longitudinal direction, and each of the mating terminals is fixedly mounted to the inner base of the pedestal and mates with a corresponding conductive connection portions.

8. The multifunctional high-voltage connector according to claim 7, wherein
    the inner base further comprises: a bottom plate portion; and two protruding portions spaced apart in the longitudinal direction, and each of the protruding portions protrudes from the bottom plate portion in a vertical direction and mounts the corresponding mating terminal;

the second guide portion is provided on each of the protruding portions.

9. The multifunctional high-voltage connector according to claim 7, wherein
the multifunctional high-voltage connector further comprises: a harness assembly connected to one of the two mating terminals;
the outer base further comprises: a mounting portion formed at an outer side of the second oblique-port portion and extending in the longitudinal direction, and the mounting portion mounts the harness assembly;
the highest point of an upper surface of the second oblique-port portion is higher than a top surface of the mounting portion.

10. The multifunctional high-voltage connector according to claim 1, wherein the outer shell and the outer base is made of a metal material, and the inner shell and the inner base is made of an insulating material.

11. A battery product, comprising a multifunctional high-voltage connector, wherein
the multifunctional high-voltage connector comprises a pedestal and an upper cover etachably assembled with the pedestal;
the upper cover comprises: an outer shell having a first oblique-port portion; and an inner shell fixed at an inner side of the outer shell and provided with a first guide portion;
the pedestal comprises: an outer base having a second oblique-port portion; and an inner base fixed at an inner side of the outer base and provided with a second guide portion;
the first oblique-port portion of the outer shell cooperates with the second oblique-port portion of the outer base, and the first guide portion of the inner shell cooperates with the second guide portion of the inner base;
the inner shell further comprises: a body portion accommodated in the outer shell; and an extending portion protruding from the body portion in a vertical direction and extending out of the outer shell;
the first guide portion is provided on the extending portion and extends in the vertical direction, and the extending portion is inserted into the inner base to make the first guide portion cooperate with the second guide portion.

12. The battery product according to claim 11, wherein an angle between a lower surface of the first oblique-port portion and a longitudinal direction and an angle between an upper surface of the second oblique-port portion and the longitudinal direction are both θ, and 5≤θ≤8.

13. The battery product according to claim 11, wherein
the first guide portion is a recessed groove, and the second guide portion is a protrusion; or
the first guide portion is a protrusion, and the second guide portion is a recessed groove.

14. The battery product according to claim 11, wherein
the first guide portions are provided on both sides of the extending portion in a longitudinal direction; or/and
the first guide portions are provided on both sides of the extending portion in a transversal direction.

15. The battery product according to claim 11, wherein
the outer shell further comprises: a first connecting portion formed at an outer side of the first oblique-port portion around a circumference of the first oblique-port portion and extending in a vertical direction;
the outer base further comprises: a second connecting portion formed at an outer side of the second oblique-port portion around a circumference of the second oblique-port portion and connecting the first connecting portion;
a lower surface of the first connecting portion and an upper surface of the second connecting portion are parallel to a longitudinal direction.

16. The battery product according to claim 11, wherein the outer shell further comprises: a guiding portion formed at an outside of the first oblique-port portion and extending in a direction paralleled to a lower surface of the first oblique-port portion.

17. The battery product according to claim 11, wherein
the multifunctional high-voltage connector further comprises a conductive connection structure and two mating terminals;
the conductive connection structure comprises: a main body portion accommodated in the inner shell of the upper cover; and two conductive connection portions formed at both ends of the main body portion in a longitudinal direction and extending out of the outer shell;
the two mating terminals are spaced apart in the longitudinal direction, and each of the mating terminals is fixedly mounted to the inner base of the pedestal and mates with a corresponding conductive connection portions.

18. The battery product according to claim 17, wherein
the inner base further comprises: a bottom plate portion; and two protruding portions spaced apart in the longitudinal direction, and each of the protruding portions protrudes from the bottom plate portion in a vertical direction and mounts the corresponding mating terminal;
the second guide portion is provided on each of the protruding portions.

19. A multifunctional high-voltage connector, comprising a pedestal and an upper cover detachably assembled with the pedestal;
the upper cover comprising: an outer shell having a first oblique-port portion; and an inner shell fixed at an inner side of the outer shell and provided with a first guide portion;
the pedestal comprising: an outer base having a second oblique-port portion; and an inner base fixed at an inner side of the outer base and provided with a second guide portion;
the first oblique-port portion of the outer shell cooperating with the second oblique-port portion of the outer base, and the first guide portion of the inner shell cooperating with the second guide portion of the inner base;
wherein
the outer shell further comprises: a first connecting portion formed at an outer side of the first oblique-port portion around a circumference of the first oblique-port portion and extending in a vertical direction;
the outer base further comprises: a second connecting portion formed at an outer side of the second oblique-port portion around a circumference of the second oblique-port portion and connecting the first connecting portion;
a lower surface of the first connecting portion and an upper surface of the second connecting portion are parallel to a longitudinal direction.

20. A multifunctional high-voltage connector, comprising a pedestal and an upper cover detachably assembled with the pedestal;

the upper cover comprising: an outer shell having a first oblique-port portion; and an inner shell fixed at an inner side of the outer shell and provided with a first guide portion;

the pedestal comprising: an outer base having a second oblique-port portion; and an inner base fixed at an inner side of the outer base and provided with a second guide portion;

the first oblique-port portion of the outer shell cooperating with the second oblique-port portion of the outer base, and the first guide portion of the inner shell cooperating with the second guide portion of the inner base;

wherein the multifunctional high-voltage connector further comprises a conductive connection structure and two mating terminals;

the conductive connection structure comprises: a main body portion accommodated in the inner shell of the upper cover; and two conductive connection portions formed at both ends of the main body portion in a longitudinal direction and extending out of the outer shell;

the two mating terminals are spaced apart in the longitudinal direction, and each of the mating terminals is fixedly mounted to the inner base of the pedestal and mates with a corresponding conductive connection portions.

\* \* \* \* \*